United States Patent
Chu et al.

(10) Patent No.: US 7,609,833 B2
(45) Date of Patent: Oct. 27, 2009

(54) ROTATING MODULE (75) Inventors: Cheng-Chung Chu, Taipei (TW);
Chiu-Lang Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 475 days.

(21) Appl. No.: 11/515,913

(22) Filed: Sep. 6, 2006

(65) Prior Publication Data
US 2007/0120764 A1    May 31, 2007

(30) Foreign Application Priority Data
Nov. 16, 2005   (TW) .............................. 94140352 A (51) Int. Cl.
*H04M 1/00* (2006.01)
*H04M 9/00* (2006.01)
(52) U.S. Cl. ................. 379/433.13; 455/575.3
(58) Field of Classification Search ............ 379/433.01, 379/433.11, 433.13; 455/90.3, 575.1, 575.3; 16/366, 367; 361/683
See application file for complete search history.

(56) References Cited
U.S. PATENT DOCUMENTS
2005/0079901 A1* 4/2005 Tracy et al. .............. 455/575.3

FOREIGN PATENT DOCUMENTS
CN   1507245 A   6/2004

* cited by examiner

*Primary Examiner*—Tuan D Nguyen
(74) *Attorney, Agent, or Firm*—Muncy, Geissler, Olds & Lowe, PLLC (57) ABSTRACT The present invention provides a rotating module for adjusting a display. The rotating module includes a first rotating part and a second rotating part that are coupled together. The first rotating part moves the display around a first axis. The second rotating part moves the display around a second axis. Therefore, the display can be completely adjusted for not only the location but also the viewing angle.

12 Claims, 8 Drawing Sheets

ROTATING MODULE

RELATED APPLICATIONS

The present application is based on, and claims priority from, Taiwan Application Serial Number 94140352, filed Nov. 16, 2005, the disclosure of which is hereby incorporated by reference herein in its entirety.

FIELD OF THE INVENTION

The present invention is related to a rotating module for a display, and more particularly to a rotating module for a display installed in a portable device.

BACKGROUND OF THE INVENTION

Many advantages exist of a liquid crystal display (LCD), such as high display quality, small volume, low weight, low voltage driving, and low power consumption. Therefore, LCDs have been extensively used in various portable electrical devices, such as mobile phones and notebooks.

Typically, the LCD is embedded in a foldable cover of a folding-type mobile phone. When using this type of mobile phone for a call, the cover is first opened to expose the LCD. A rotating mechanism is installed between the cover and the base of the mobile phone for adjusting the opening angle of the cover to change the LCD view angle. However, the LCD is rotated around a fixed axis so the distance between the LCD and the base is fixed. Therefore, the LCD position has to be considered when using the keyboard. For example, the control key of a typical foldable mobile phone is located close to the LCD such that using the control key obstructs the user from viewing the LCD.

Therefore, it is the goal for a designer to create a mobile phone with an LCD that can be freely adjusted by a user for changing its view angle and location.

SUMMARY OF THE INVENTION

The purpose of the present invention is to provide a rotating module that permits the display to rotate around two different axes for adjusting the view angle.

Another purpose of the present invention is to provide a rotating module for a user to freely adjust the view angle of the display.

A further purpose of the present invention is to provide a rotating module that parallelly arranges the display module and the keyboard module.

According to the foregoing purposes, the embodiment of the present invention provides a rotating module used in a portable device with a cover and a base. The cover has a coupling part for coupling with the base module. The coupling parts is separable from the base module. The rotating module is fixed in the base for connecting with the cover. The rotating module includes a first rotating part and a second rotating part connected together. The first rotating part can provide the cover to rotate around the first axis. The second rotating part fixed in the base can provide the cover to rotate around the second axis. The first rotating part couples with the cover. The cover coupling with the base can rotate around the first axis. When the first coupling part of the cover is connected to the second coupling part of the base, the cover can rotate around the first axis to cover the base. When the coupling part of the cover is separated from the base, the cover couples with the base through the rotating module, and the second rotating part can rotate the cover around the second axis. The included angle between the first axis and the second axis may be 90 degrees or other angle based on the device design.

The embodiment of the present invention provides a portable device with an adjustable display. This portable device includes a cover, a base module and a rotating module. The cover has a coupling part for coupling with the base module. The coupling module is separable from the base module. The cover is connected to the base module through the rotating module. The rotating module includes a first rotating part and a second rotating part connected together. The first rotating part can provide the display to rotate around the first axis. When the coupling part couples with the base module, the first rotating part can provide the cover to rotate around the first axis to cover the base module. The second rotating part is fixed in the base module. When the coupling part separates from the base module, the second rotating part can provide the cover to rotate around the second axis to parallelly arrange the cover and the base module.

BRIEF DESCRIPTION OF THE DRAWINGS

The foregoing aspects and many of the attendant advantages of this invention are more readily appreciated and better understood by referencing the following detailed description, when taken in conjunction with the accompanying drawings, wherein.

DETAILED DESCRIPTION OF THE PREFERRED EMBODIMENT

The following describes the preferred embodiment of the present invention.

Figure 1:
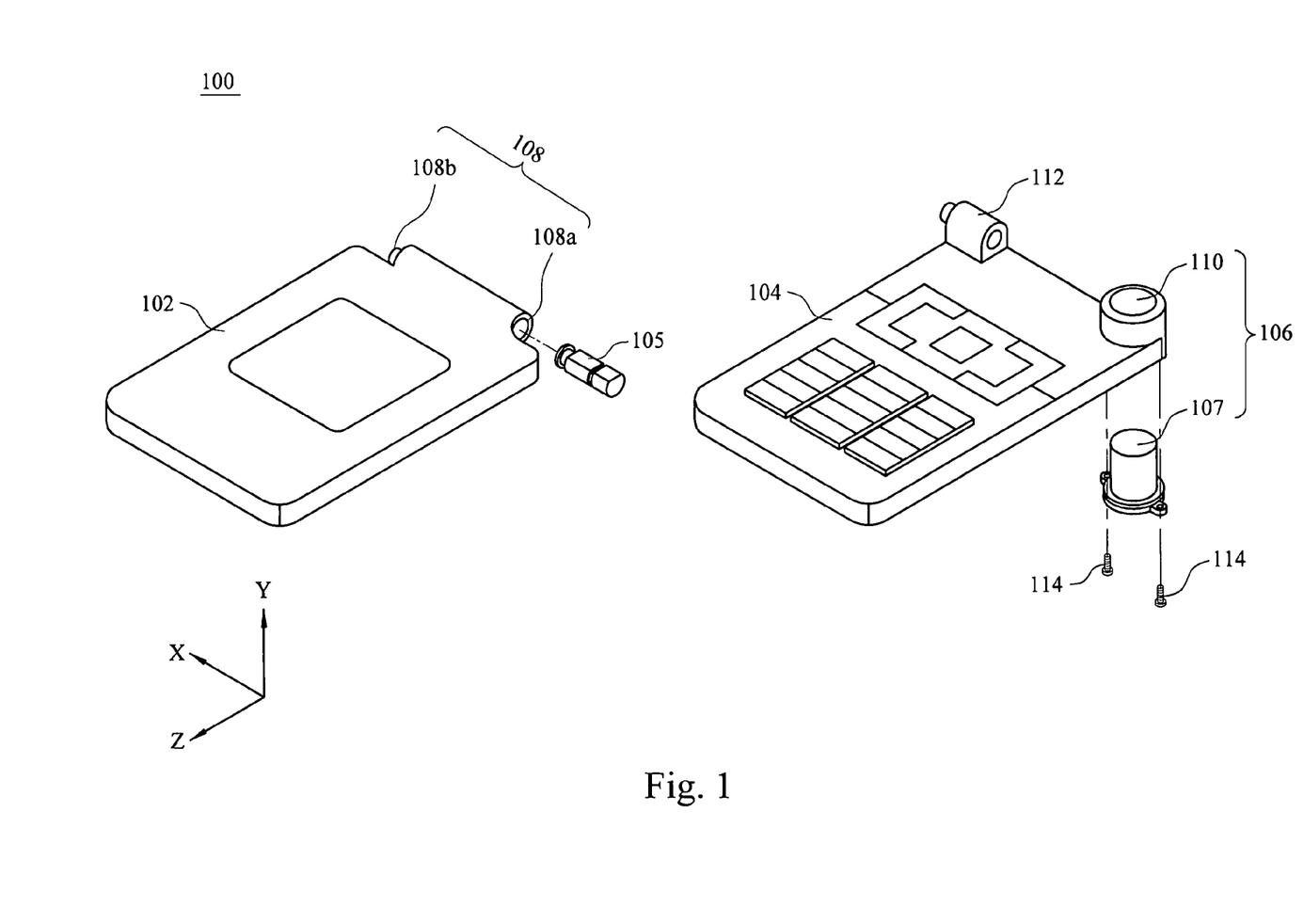
FIG. 1 is an exploded view of a portable device with a rotating module according to the preferred embodiment of the present invention.

FIG. 1 is an exploded view of a portable device with a rotating module according to the preferred embodiment of the present invention. The rotating module is used in a portable device 100 with a foldable cover, wherein the portable device 100 includes a cover 102, a base module 104, and a rotating module 106. A display (not shown in this figure) is embedded in the cover 102. The first end 108a of the first coupling part 108 in the cover 102 is connected to the second coupling part 110 of the base module 104 through the rotating module 106. The second end 108b of the first coupling part 108 is connected to the third coupling part 112 of the base module 104. A tenon is embedded in the third coupling part 112 of the base module 104. A user can control the tenon to release the second end 108b of the first coupling part 108 from the third coupling part 112. In this case, the cover 102 and the base module are connected together only through the rotating module 106.

The rotating module 106 includes first and second rotating parts 105 and 107. The first rotating part 105 can rotate the cover 102 around the X-axis from 0 to 180 degrees. The second rotating part 107 can rotate the cover 102 around the Y-axis form 0 to 180 degrees. The first rotating part 105 is fixed in the first end 108a of the first coupling part 108. The second rotating part 107 is fixed, such as by screws, in the second coupling part 110. When combined to form the portable device 100, the first rotating part 105 is coupled to the second rotating part 107 to combine the cover 102 and the base module 104.

Figure 2:
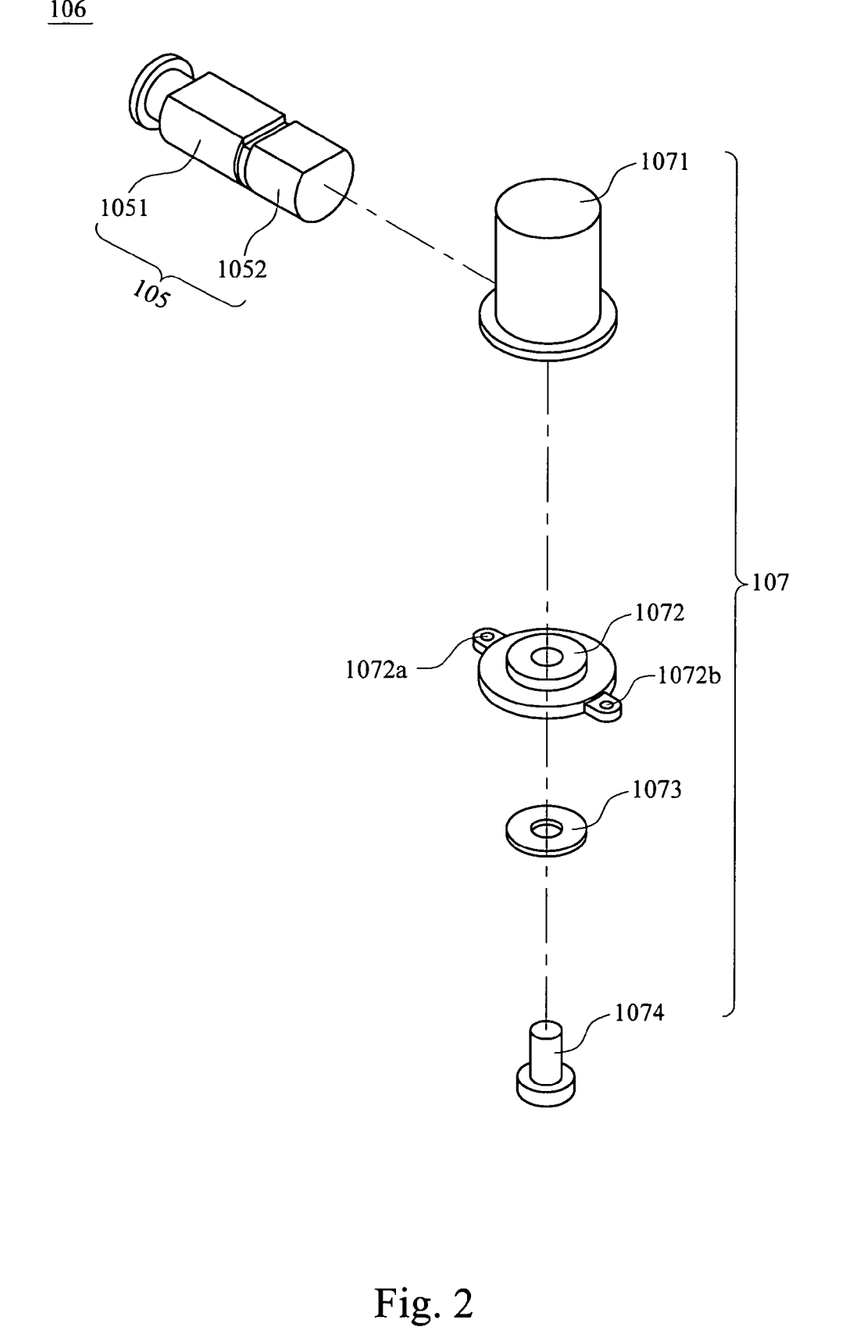
FIG. 2 is an exploded view of the rotating module according to the preferred embodiment of the present invention.

FIG. 2 is an exploded view of the rotating module according to the preferred embodiment of the present invention, in which the rotating module 106 includes a first rotating part 105 and a second rotating part 107. The second rotating part 107 includes a rotating means 1071, a rotating base 1072, a fixed piece 1073 and a fixed axis 1074. The fixed axis 1074 passes through the hole in the center of the fixed piece 1073 to fix the rotating means 1071 in the rotating base 1072. There are two fixed holes 1072a and 1072b in the base 1072. The screws 114 insert through the holes to fix the base 1072 in the second coupling part 110, as shown in FIG. 1. Such fixing ensures that the base 1072 does not move when the rotating means 1071 is rotated. The first rotating part 105 also includes a rotating means 1051 and a fixed axis 1052 that is fixed in the rotating means 1071 such as by a hole (not shown in this figure) formed in the rotating means 1071. Then, the fixed axis 1052 is fixed in the hole. Such structure ensures that the second rotating part 107 is not influenced by the rotating means 1051 when it rotates around the fixed axis 1052.

Figure 3:
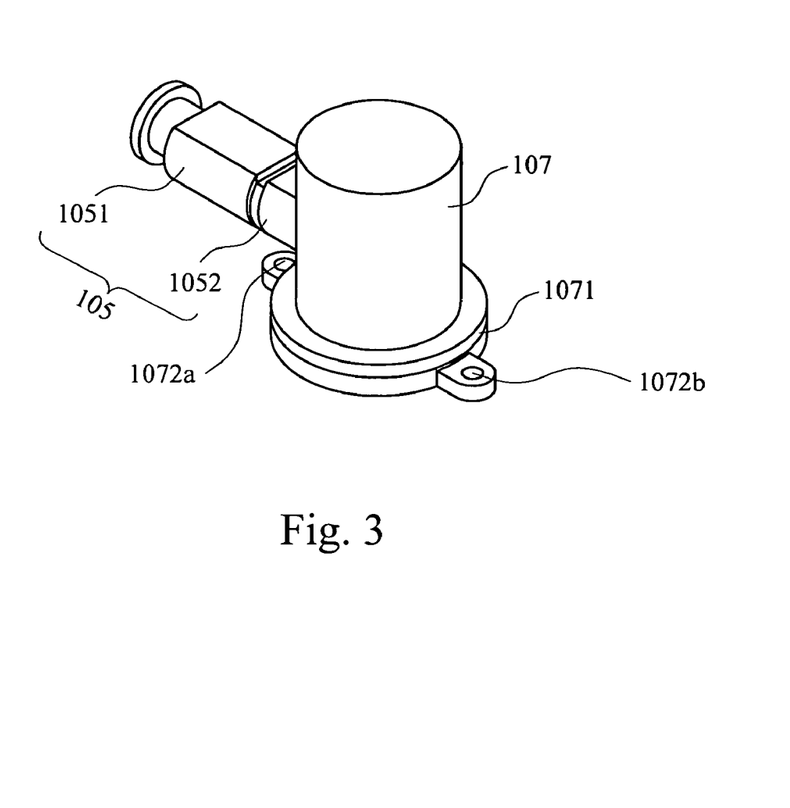
FIG. 3 illustrates an assembly of the rotating module according to the preferred embodiment of the present invention.

FIG. 3 illustrates an assembly of the rotating module according to the preferred embodiment of the present invention. The first rotating part 105 through the fixed axis 1052 is connected to the second rotating part 107. The rotating means 1051 of the first rotating part 105 is fixed in the first end 108a of the first coupling part 108 as shown in FIG. 1. The rotating base 1072 of the second rotating part 107 is fixed in the second coupling part 110. The cover 102 is connected with the base module 104 through the coupling of the first rotating part 105 and the second rotating part 107.

Figure 4A:
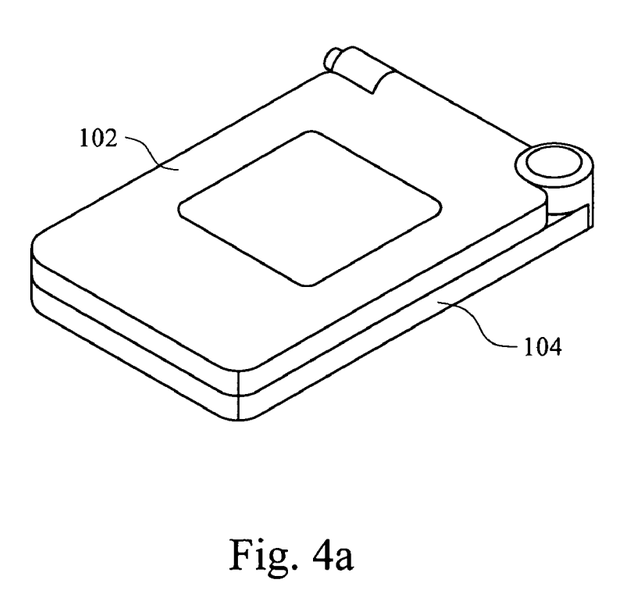
FIGS. 4a to 4d illustrate operation of a portable device by the rotating module of the present invention.

FIGS. 4a to 4d illustrate operation of a portable device by the rotating module of the present invention. Reference is also made to FIGS. 5a to 5d which specifically illustrate the corresponding operation of the rotating module 106 through the steps shown in FIG. 4. In FIG. 4a, a foldable cover 102 of a mobile phone is closed to the base module 104. In this case, the rotating module 106 is in a normal state as shown in FIG. 5a.

Figure 4B:
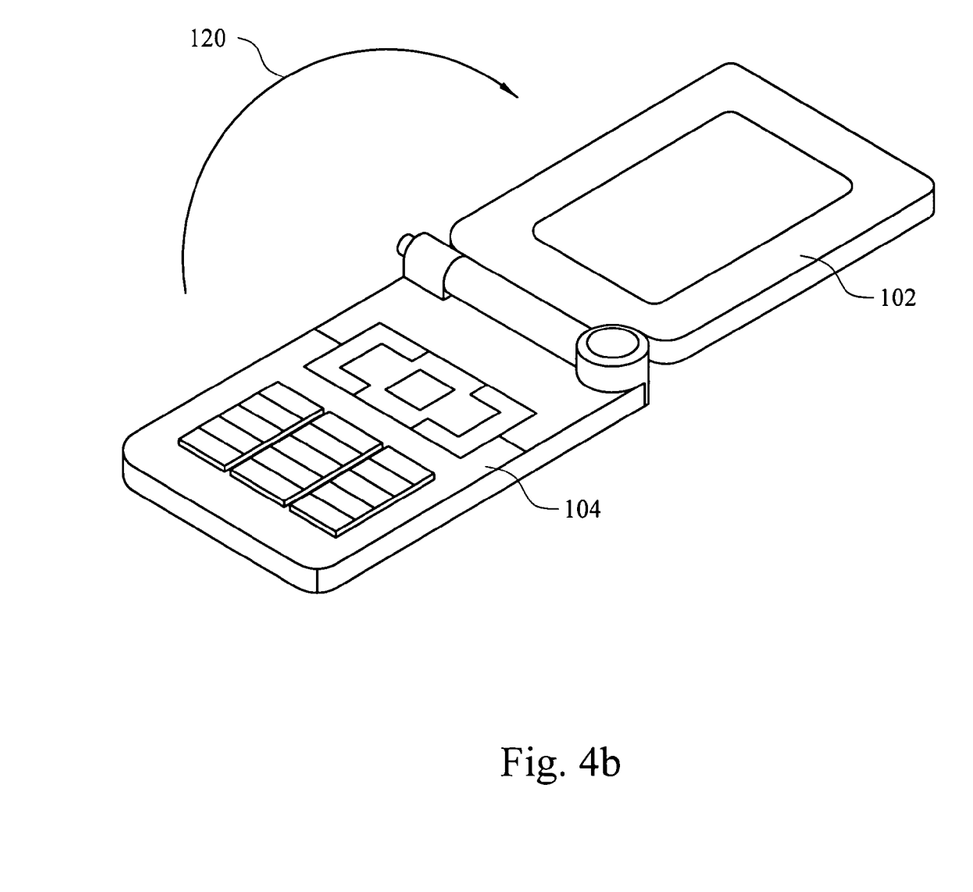
Figure 4C:
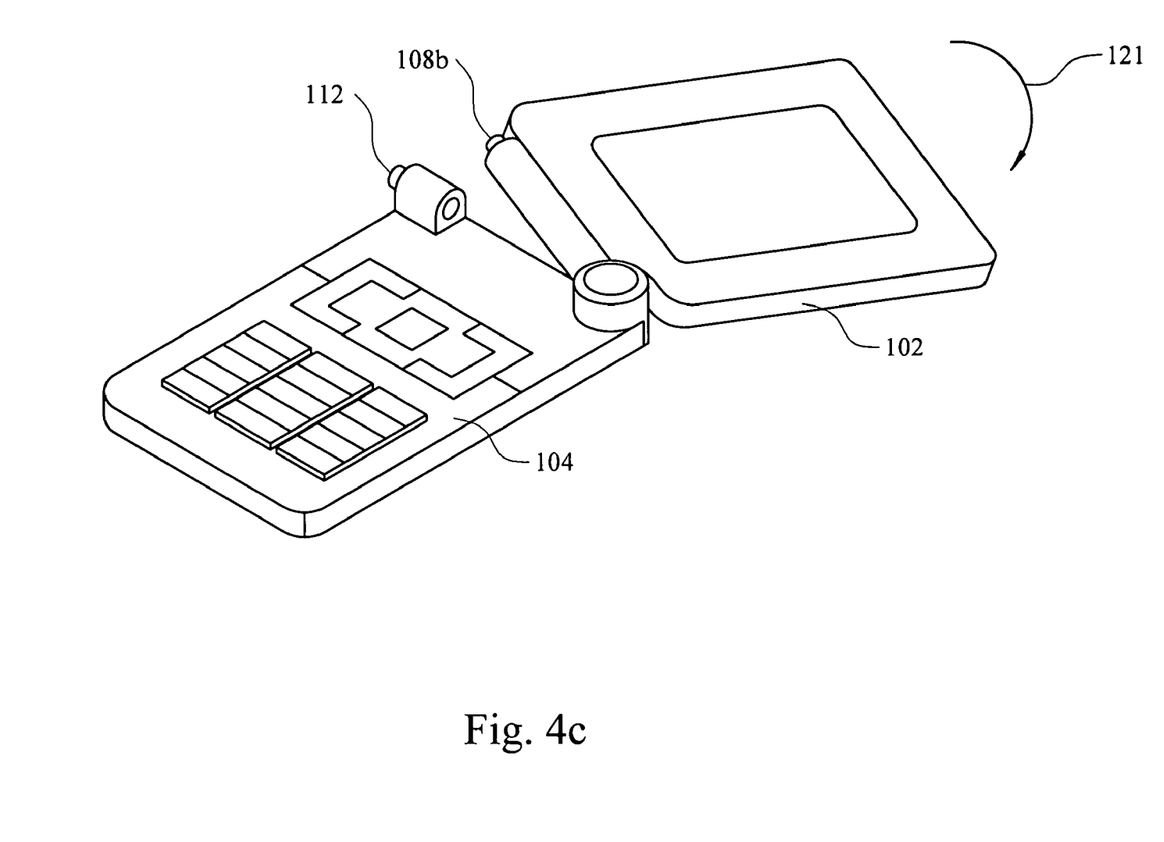
Figure 4D:
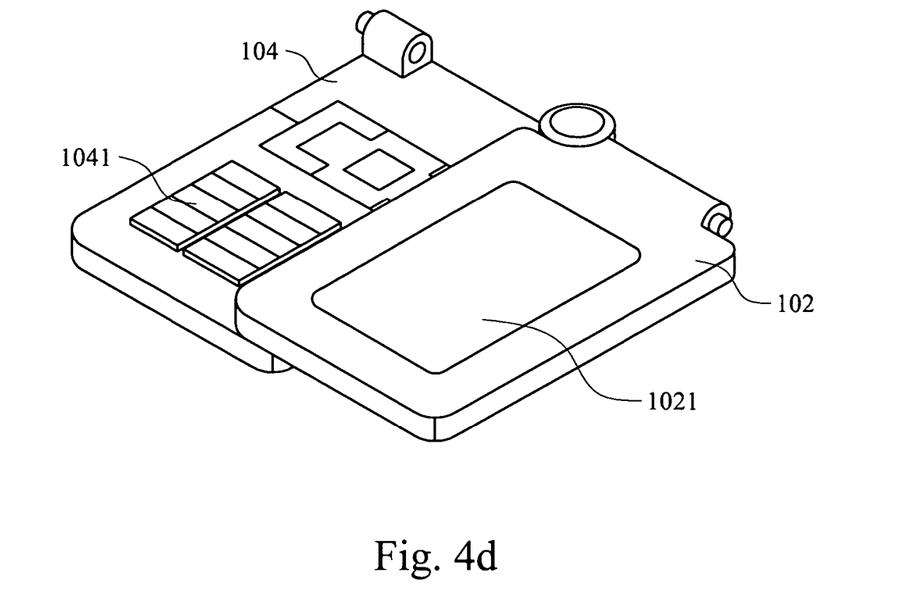
Figure 5A:
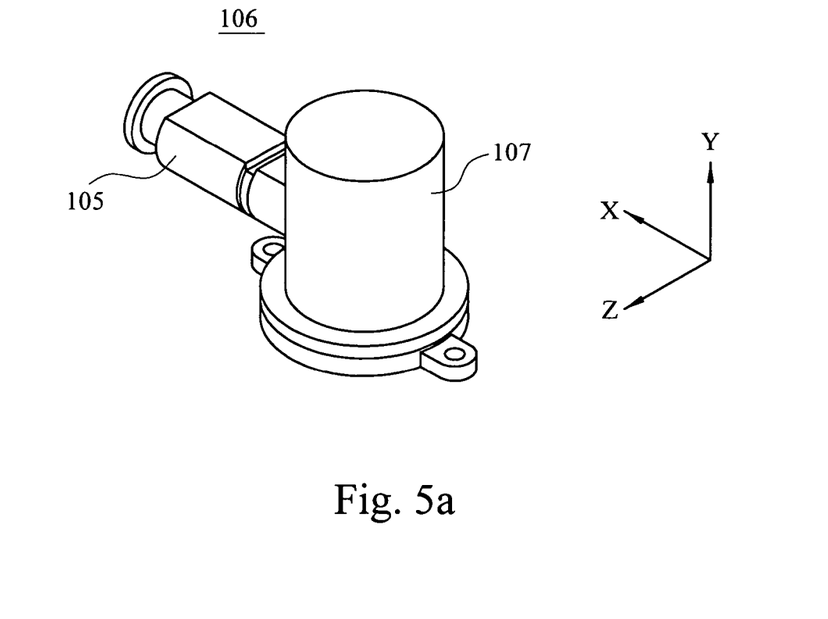
FIGS. 5a to 5d specifically illustrate operation of the rotating module throughout the steps of FIGS. 4a to 4d.
Figure 5B:
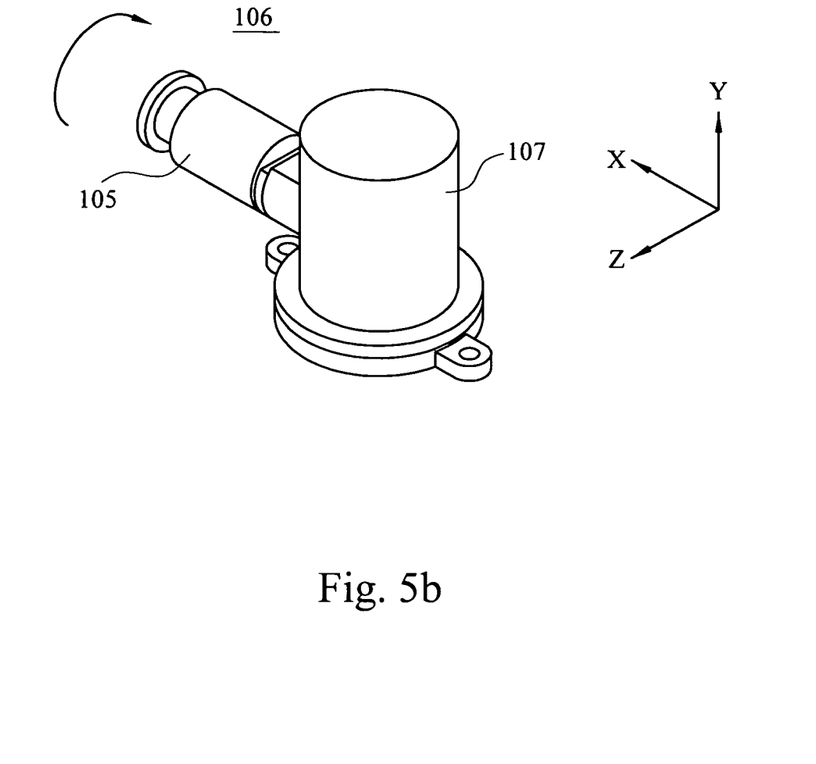
Figure 5C:
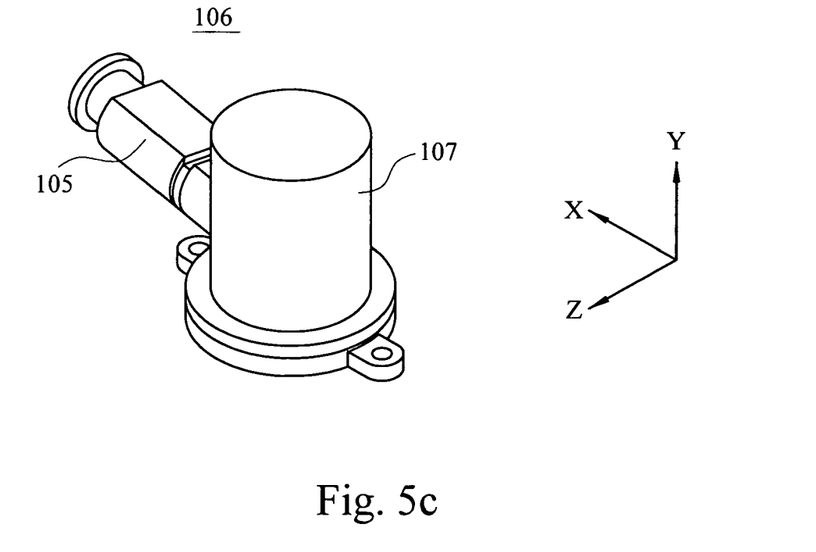
Figure 5D:
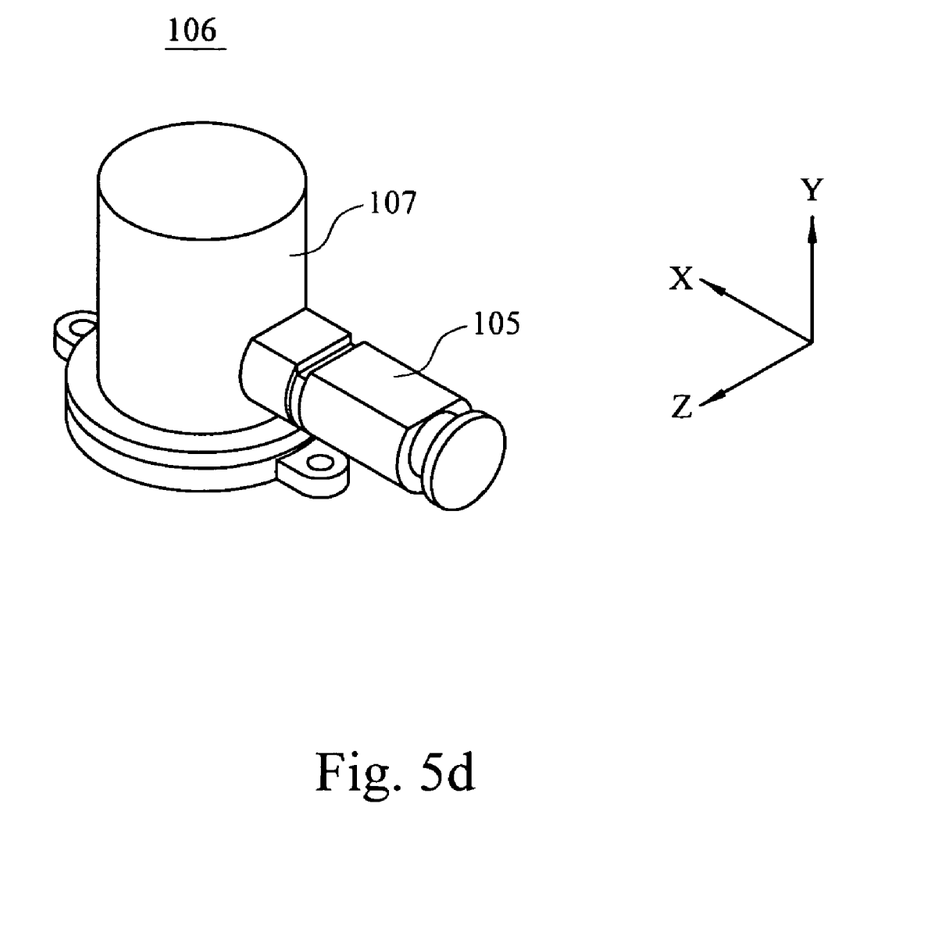

In FIG. 4b, the foldable cover 102 is lifted by a user along the direction of the arrow 120. In this case, the first rotating part 105 of the rotating module 106 is rotated 180 degrees clockwise around the X-axis to lift the cover 102 as shown in FIG. 5b. In FIG. 4c, the second end 108b of the first coupling part 108 is released from the third coupling part 112. The cover 102 is rotated along the direction of the arrow 121. In this case, the second rotating part 107 of the rotating module 106 is rotated clockwise around the Y-axis as shown in FIG. 5c. In FIG. 4d, the cover 102 is rotated to the position parallel to the base module 104. In this case, the second rotating part 107 of the rotating module 106 is rotated 180 degrees clockwise around the Y-axis as shown in FIG. 5d.

Reference is made to FIG. 4d again. The display embedded in the cover 102 can be rotated to be parallel with the keyboard 1041 of the base module 104. In this case, the keyboard 1041 is under the display 1021. The relationship between the keyboard 1041 and the display 1021 is similar to a portable notebook. Therefore, a user can use the wide display to show certain material or to type as a portable notebook.

Accordingly, the rotating module of the present invention can adjust the display in two different directions. Therefore, it can completely adjust the display for not only the location but also the viewing angle. Moreover, the display can be rotated to be parallel with the keyboard. Such structure may provide a wide display to show certain material and to type as a portable notebook.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A rotating module used in a portable communication device, wherein said portable communication device includes a base module and a cover, wherein said cover has a first coupling part and said base module has a second coupling part and a third coupling part respectively coupling with the two ends of said first coupling part, wherein said third coupling part is separable from said first coupling part, comprising:

a first rotating part coupling with said cover, wherein said first rotating part rotates around a first axis, wherein when said third coupling part couples with said first coupling part, said first rotating part may bring said cover to rotate around said first axis to cover said base module; and a second rotating part fixing in said second coupling part and coupling with said first rotating part, wherein said second rotating part rotates around a second axis, wherein when said third coupling part separates from said first coupling part, said second rotating part may bring said cover to rotate around said second axis to make said cover parallel with said base module.

2. The rotating module of claim 1, wherein said first axis is perpendicular to said second axis.

3. The rotating module of claim 1, wherein said first rotating part further comprises a rotating means and a fixed means, wherein said fixed means is fixed in said second rotating part and said rotating means is used to bring said cover to rotate around said first axis.

4. The rotating module of claim 1, wherein said second rotating part further comprises a fixed means and a rotating means, wherein said fixed means is fixed in said base module and said rotating means is coupled with said first rotating part for bringing said cover to rotate around said second axis.

5. The rotating module of claim 1, wherein said first rotating part may rotate said cover from 0 to 180 degrees.

6. The rotating module of claim 1, wherein said second rotating part may rotate said cover from 0 to 180 degrees.

7. A portable communication device, comprising:

a cover with a first coupling part and a display embedded in said cover;

a base module with a second coupling part and a third coupling part respectively coupling with the two ends of said first coupling part, wherein said third coupling part is separable from said first coupling part;

a first rotating part coupling with said cover, wherein said first rotating part rotates around a first axis, wherein when said third coupling part couples with said first coupling part, said first rotating part may bring said cover to rotate around said first axis to cover said base module; and a second rotating part fixing in said second coupling part and coupling with said first rotating part, wherein said second rotating part rotates around a second axis, wherein when said third coupling part separates from said first coupling part, said second rotating part may bring said cover to rotate around said second axis to make said cover parallel with said base module.

8. The portable communication device of claim 7, wherein said first axis is perpendicular to said second axis.

9. The portable communication device of claim 7, wherein said first rotating part further comprises a rotating means and a fixed means, wherein said fixed means is fixed in said second rotating part and said rotating means is used to bring said cover to rotate around said first axis.

10. The portable communication device of claim 7, wherein said second rotating part further comprises a fixed means and a rotating means, wherein said fixed means is fixed in said base module and said rotating means is coupled with said first rotating part for bringing said cover to rotate around said second axis.

11. The portable communication device of claim 7, wherein said first rotating part may rotate said cover from 0 to 180 degrees.

12. The portable communication device of claim 7, wherein said second rotating part may rotate said cover from 0 to 180 degrees.

* * * * *